United States Patent
Liu et al.

(10) Patent No.: US 10,392,517 B2
(45) Date of Patent: Aug. 27, 2019

(54) OPTICAL ARTICLE COMPRISING AN ELECTRICALLY CONDUCTIVE LAYER, AND PRODUCTION METHOD

(71) Applicant: ESSILOR INTERNATIONAL (COMPAGNIE GENERALE D'OPTIQUE), Charenton-le-Pont (FR)

(72) Inventors: Richard Liu, Singapore (SG); Hui Yu, Singapore (SG); Bastien Feret, Singapore (SG)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 291 days.

(21) Appl. No.: 15/108,134

(22) PCT Filed: Dec. 22, 2014

(86) PCT No.: PCT/EP2014/079065
§ 371 (c)(1),
(2) Date: Jun. 24, 2016

(87) PCT Pub. No.: WO2015/097180
PCT Pub. Date: Jul. 2, 2015

(65) Prior Publication Data
US 2016/0326380 A1    Nov. 10, 2016

(30) Foreign Application Priority Data

Dec. 24, 2013   (EP) .................................... 13306861

(51) Int. Cl.
*C08L 71/00*   (2006.01)
*C09D 5/00*   (2006.01)
(Continued)

(52) U.S. Cl.
CPC ................ *C09D 5/24* (2013.01); *C03C 17/00* (2013.01); *C08G 18/246* (2013.01);
(Continued)

(58) Field of Classification Search
CPC .......... C08L 71/02; C08L 71/00; C08L 67/00; C08L 75/00; C08K 3/017; C08K 3/24
See application file for complete search history.

(56) References Cited

U.S. PATENT DOCUMENTS 4,211,823 A   7/1980   Suzuki et al. ................. 428/412
5,015,523 A   5/1991   Kawashima et al. ......... 428/336
(Continued)

FOREIGN PATENT DOCUMENTS

CN   101130661   2/2008
DE   3942990   6/1991
(Continued)

OTHER PUBLICATIONS

English translation of Chinese Application No. 101130661.
(Continued)

*Primary Examiner* — Rip A Lee
(74) *Attorney, Agent, or Firm* — Norton Rose Fulbright US LLP

(57) ABSTRACT

The present invention relates to a curable antistatic primer composition, comprising: (d) at least one polyalkylene oxide polymer; (e) at least a Lithium salt; (f) at least an amorphizer selected from at least a dendritic polymer. The present invention also relates to an optical article having at least one surface comprising an antistatic primer coating obtained by depositing on a substrate and curing said composition, and its production method.

23 Claims, 1 Drawing Sheet

(51) Int. Cl.

| | | |
|---|---|---|
| *C09D 5/24* | (2006.01) | |
| *C08L 101/00* | (2006.01) | |
| *C08G 18/48* | (2006.01) | |
| *C08G 83/00* | (2006.01) | |
| *C08G 18/73* | (2006.01) | |
| *C08G 18/24* | (2006.01) | |
| *C09D 175/04* | (2006.01) | |
| *C08G 18/40* | (2006.01) | |
| *C08G 18/42* | (2006.01) | |
| *C08K 5/42* | (2006.01) | |
| *C09D 201/00* | (2006.01) | |
| *G02B 1/16* | (2015.01) | |
| *C03C 17/00* | (2006.01) | |
| *C09D 175/08* | (2006.01) | |
| *C09K 3/16* | (2006.01) | |

(52) U.S. Cl.
CPC ..... *C08G 18/4018* (2013.01); *C08G 18/4283* (2013.01); *C08G 18/4833* (2013.01); *C08G 18/73* (2013.01); *C08G 83/002* (2013.01); *C08K 5/42* (2013.01); *C08L 101/005* (2013.01); *C09D 5/00* (2013.01); *C09D 5/002* (2013.01); *C09D 175/04* (2013.01); *C09D 175/08* (2013.01); *C09D 201/005* (2013.01); *C09K 3/16* (2013.01); *G02B 1/16* (2015.01)

(56) References Cited

U.S. PATENT DOCUMENTS

| | | | | |
|---|---|---|---|---|
| 5,436,090 | A * | 7/1995 | Kono | H01M 4/02 429/317 |
| 6,458,875 | B1 | 10/2002 | Sandlin et al. | 524/168 |
| 6,852,406 | B2 | 2/2005 | Marechal et al. | 428/336 |
| 7,897,674 | B2 * | 3/2011 | Zaghib | C08F 283/00 524/435 |
| 2002/0018887 | A1 | 2/2002 | Sumida et al. | 428/331 |
| 2003/0023001 | A1 * | 1/2003 | Kerr | C08G 65/14 525/242 |
| 2006/0204844 | A1 * | 9/2006 | Costanzo | H01M 2/1686 429/206 |
| 2008/0206470 | A1 | 8/2008 | Thomas et al. | 427/402 |
| 2009/0118436 | A1 * | 5/2009 | Niitani | C08F 4/00 525/390 |
| 2010/0282712 | A1 * | 11/2010 | Ben-Moshe | C03C 15/00 216/97 |
| 2012/0045577 | A1 | 2/2012 | Feret et al. | 427/162 |
| 2012/0049120 | A1 * | 3/2012 | Chen | C09D 11/10 252/301.35 |

FOREIGN PATENT DOCUMENTS

| | | |
|---|---|---|
| DE | 4117257 | 12/1992 |
| EP | 0614957 | 9/1994 |
| EP | 0649816 | 4/1995 |
| EP | 0834092 | 4/1998 |
| WO | WO 1994/010230 | 5/1994 |
| WO | WO 2001/088047 | 11/2001 |
| WO | WO 2003/063287 | 7/2003 |
| WO | WO 2009/004222 | 1/2009 |
| WO | WO 2012/009729 | 1/2012 |

OTHER PUBLICATIONS

International Search Report and Written Opinion issued in PCT/EP2014/079065, dated Feb. 3, 2015.

Owens et al., "Estimation of the surface force energy of polymers", *J Appl Polym Sci*, 51: 1741-1747, 1969.

\* cited by examiner

OPTICAL ARTICLE COMPRISING AN ELECTRICALLY CONDUCTIVE LAYER, AND PRODUCTION METHOD

CROSS-REFERENCE TO RELATED APPLICATIONS

This application is a national phase application under 35 U.S.C. § 371 of International Application No. PCT/EP2014/079065 filed 22 Dec. 2014, which claims priority to European Patent Application No. 13306861.9 filed 24 Dec. 2013. The entire contents of each of the above-referenced disclosures is specifically incorporated by reference herein without disclaimer.

BACKGROUND OF THE INVENTION

1. Field of the Invention

The present invention generally relates to an optical article, especially an ophthalmic lens, having both antistatic and antireflection or reflective properties, which advantageously reduce the attraction of dust on its surface, as well as to a method for making such an optical article.

In particular, the present invention relates to a curable antistatic primer composition having good impact resistant property and good adhesion onto a substrate of the optical article, and its production method

2. Description of Related Art

It is known to protect surfaces of ophthalmic glasses, whether they are mineral or organic, by means of hard coatings (abrasion-resistant and/or scratch-resistant coatings) which are typically based on a polysiloxane.

It is also known to treat ophthalmic lenses, so as to prevent any unwanted reflected light from appearing. The lens is then provided with a mono- or a multilayered antireflective coating, generally made of a mineral material.

When the lens comprises within its structure a hard abrasion-resistant coating, the antireflective coating is generally deposited onto the abrasion-resistant layer surface. Such a stack reduces the impact strength, by rigidifying the system then becoming brittle. This problem is well known in the industry of ophthalmic lenses made of organic glass.

To counteract such a drawback, it has been suggested to provide an impact-resistant primer layer between the lens in organic glass and the abrasion-resistant hard coating.

It is also well known that optical articles made of substantially insulating materials tend to have their surface becoming easily charged with static electricity, particularly when cleaned under dry conditions by rubbing their surface with a wiping cloth, a piece of synthetic foam or of polyester (triboelectricity). Charges present on the surface thereof do create an electrostatic field able of attracting and retaining objects with a very low weight standing in the vicinity (a few centimeters away therefrom), generally very small sized-particles such as dust, and for all the time the charge remains effective on the article.

In order to reduce or to inhibit the particle attraction, it is necessary to reduce the electrostatic field intensity, that is to say to reduce the number of static charges present on the article surface. This may be done by making the charges mobile, for example by inserting a layer of a material inducing a strong mobility of the "charge carriers", while having good adhesion on substrates, such as organic substrates. The materials inducing the strongest mobility are the so called conducting materials. Thus, a high-conductivity material makes it possible to more rapidly dissipate the charges.

It is also known that even if abrasion-resistant hard coating is applied on the ophtamlic glasses, this hard coat may be scratched when hard dust particles are deposited on the lens surface and is rubbed by the cloth.

The state of the art reveals that an optical article may be given antistatic properties by incorporating into the surface thereof, in the functional coating stack, at least one electro-conductive layer, or "antistatic layer", both expressions being used indifferently.

Such an antistatic layer may form the outer layer of the functional coating stack, or an intermediate layer (inner layer), or may be directly deposited onto the optical article substrate. Incorporating such a layer into a stack provides the article with antistatic properties, even if the antistatic coating is inserted between two not antistatic coatings or substrates.

As used herein, "antistatic" is intended to mean the ability not to retain and/or develop a substantial electrostatic charge. An article is generally considered as having acceptable antistatic properties, when neither attracting nor retaining dust and small particles after one surface thereof has been rubbed using a suitable wiping cloth. It is able to rapidly dissipate the accumulated electrostatic charges, so that such an article seems to be cleaner after having been wiped.

Various methods for quantifying the antistatic properties of a material may be used. For instance, the ability for a glass to drain a static charge off may be quantified by measuring the dissipation time of said charge. Thus, in the present application, a glass is considered as having good antistatic performance if its discharge time is equal to or lower than 500 milliseconds, and preferably around 100-200 milliseconds. Static glasses may possess discharge times of several dozens of seconds and when they have been just wiped may attract surrounding dust during all the time required for their charge to be drained off.

The known antistatic coatings comprise at least one antistatic agent, which is generally a metal oxide (semi) conductor optionally doped, such as indium-tin oxide (ITO), zinc oxide.

Indium-tin oxide (ITO) is the most popular material. It may be indium-doped tin oxide or tin-doped indium oxide. The most commonly used material is typically tin-doped indium oxide, tin being used in an amount of from 5 to 17% by weight.

The applications or patents EP 0834092, DE 3942990, DE 4117257, U.S. Pat. No. 6,852,406, and US 2002/018887 disclose optical articles, especially ophthalmic lenses, provided with an antireflection stack that is mineral in nature comprising a mineral, transparent electrically conductive layer that has been deposited under vacuum, based on titanium dioxide, indium-tin oxide (ITO), zinc oxide, tin oxide, etc. The ITO layer described in the U.S. Pat. No. 6,852,406 has been generally formed from a source comprising 90% indium oxide and 10% tin oxide.

The patent WO 2009/004222, in the name of the applicant, discloses an optical article with antireflection properties, comprising a substrate having at least one main surface coated with an antireflection coating which may comprise at least one electrically conductive layer. This layer preferably comprises a metal oxide selected from indium, tin, zinc oxides and their combinations, the preferred material being indium-tin oxide (ITO).

However, antireflection coatings comprising an ITO-based antistatic layer do not reveal fully satisfying. ITO layers need to be deposited by vacuum deposition in a controlled gas atmosphere. Hence, this solution has the drawbacks of a high cost process (vacuum deposition process) and a lack of flexibility, for instance when the customers want antistatic performance but not antireflection (AR) treatment.

In addition, ITO-based antistatic layers as a drawback suffer from absorbing in the visible range in a not negligle way, so that their thickness must be relatively low, so as to be not detrimental to the transparency properties of the optical article.

To overcome this general issue, polymer electrolytes hybrids have been proposed to form antistatic coating.

In particular, the document US 2012/045577 decribes an antistatic sol/gel primer coating composition comprising:

(a) a hydrolyzate resulting from at least partial hydrolysis of a component A consisting of one or more compounds containing at least one polyalkylene oxide segment and at least one-$Si(X)_n$ hydrolyzable group in which n is an integer ranging from 1 to 3, and the X groups independently are precursors of OH groups, such as a silylated polyethylene oxide (silylated PEO); and (b) at least one inorganic metal salt, such as Li;

wherein component A generates a cross-linked structure upon polymerization of the composition, the dry extract of the composition containing less than 5% by weight free polyalkylene oxide polymers.

So as to form the antistatic primer composition, the silylated polyethylene oxide is hydrolyzed with hydrochloric acid and then a catalyst, a surfactant and lithium salts are added.

The antistatic primer coating made from the above disclosed composition displays good antistatic performances (decay time of arounds 200 ms or less) while having high optical transparency (0% light absorption is achieved).

However, in the system formed by silylated PEO and Li salts, the ionic transport exists mainly in the amorphous phase of the polyethylene oxide (PEO) polymer, whereas the crystalline phase is mostly non-conductive.

In addition, crystallites of silylated PEO matrix induce light scattering, which yields haze on the optical article wherein the antistatic coating sol/gel has been deposited.

Thus, in order to obtain conductive coatings, the crystallization risks should be controlled.

Furthermore, the presence of PEO-Li system in the coatings generally degrades the overall mechanical performances of the optical article, especially hardness (scratch resistance), even if a hard coat is deposited directly onto the antistatic primer layer as compared with standard non-conductive primers.

Moreover, the adhesion of PEO-based primers on certain organic substrates such as MR7®, MR8®, PC (polycarbonate), acrylic lenses of refractive index about 1.6 and high index lenses (such as those materials which have an index of 1.74) can be sometimes lacking.

Other antistatic primer coating composition do not contain PEO. U.S. Pat. No. 6,458,875 describes a poly-urethane-based antistatic coating formed from a composition including polycapolactone (PCL) triol, polycaproloactone diol and bis (4-isocyanato-cyclohexyk)methane. This document teaches to incorporate to this composition 0.5 to 5.0 weight percent of an ionizable salt of a perfluoroalkylsulfonimide, such as lithium trifluoro-methanesulfonimide, to enhance electrical conductivity.

In this document silylated PEO matrix has been replaced by polycaprolactone (PCL) triol and diol. In addition, this document does not mention any reference to the use in ophthalmic articles such as eyeglass lenses.

It should therefore be appreciated that there is a need for improved antistatic primer compositions, especially improved polyurethane antistatic primer compositions, in which the crystallization risks are prevented, while having electrical conductivity without adversely affecting the composition's transparency and or adhesion to an underlying substrate.

In addition, it is still desirable to produce new antistatic primer compositions, which result in antistatic primer coatings that do not impair the optical and mechanical properties of the coated optical article.

Indeed, a unique antistatic primer composition having improved adhesion, mechanical properties and good antistatic properties on all substrate is highly desirable.

In particular, the new antistatic compositions shall provide antistatic primer coatings capable of being themselves coated through a wet coating technique with additional coatings such as an abrasion-resistant and/or scratch resistant coating, while keeping their excellent antistatic properties.

A further goal of the invention is to provide such antistatic primer compositions for forming antistatic and optionally abrasion and/or scratch-resistant layers providing both good adhesion to an optical substrate and/or an additional functional coating formed thereon, and at the same time preserving the optical and mechanical properties of the obtained optical article, for example an ophthalmic lens, (high transmittance, low haze, good abrasion/scratch resistance, good impact resistance) and/or other additional properties such as anti-reflection, anti-smudge, anti-fogging, etc.

Further, soft plastic substrates such as plastic lenses are generally made of soft polymer materials and are easily scratched especially when the lenses are cleaned using a cloth and especially when there are dust deposited on the surfaces. Thus, an antistatic and abrasion and/or scratch resistant primer coating is usually needed for plastic lenses or other soft substrates.

SUMMARY OF THE INVENTION

Therefore, a first object of the invention is to provide a novel curable antistatic primer composition which is capable of imparting antistatic properties to an article, especially a transparent article and avoids the drawbacks of the prior art compositions, especially avoiding the crystallization risks of the PEO matrix and the lowered mechanical properties of antistatic primer composition based on PEO/Li system.

Especially, the coatings obtained by the curable antistatic primer compositions of the invention have a low haze along with very good antistatic properties and very good mechanical properties, such as hardness (scratch resistance) and abrasion resistance, while having at the same time good adhesion to an underlying substrate.

To achieve the foregoing objects, there is provided a curable antistatic primer composition, comprising:

(a) at least one polyalkylene oxide polymer;

(b) at least a Lithium salt;

(c) at least an amorphizer selected from at least a dendritic polymer.

Preferably, the weight ratio of (dry extract of said dendritic polymer)/(dry extract of said polyalkylene oxide polymer) is ranging from 0.05 to 1.5.

Due to its properties, the curable antistatic primer composition according to the invention enhances electrical conductivity without adversely affecting the composition's transparency and/or adhesion to an underlying substrate.

More particularly, and as it is illustrated in the examples below, the curable antistatic primer composition of the invention can be surprisingly used with different kinds of substrates: the adhesion is good for instance with CR39, MR7, MR8, MR1.74 and acrylic lens substrates, while having both low haze and excellent anti-abrasion properties.

Moreover, the presence of the amorphiser, selected from at least a dendritic polymer, and the specific weight ratio dendritic polymer/polyalkylene oxide polymer according to the invention, enable to prevent crystallization risks of the polyalkylene oxide polymer, especially if this one is selected from PEO, while preserving the solubility of lithium salts with good mechanical properties and good antistatic performance.

Without being bound to any theory, the Applicant found that the dendritic polymer according to the invention could minimize the polyalkylene oxide polymer crystallization in bulk state, such as PEO-Li system so that the local concentration in polyalkylene oxide polymer is mostly bellow the crystallization point.

Furthermore, the presence of the dendritic polymer in the curable antistatic primer composition enables to obtain an antistatic coating having good mechanical performances, especially good hardness (scratch resistance) as compared with standard antistatic primer composition.

In addition, due to its properties, the antistatic coating compositions, resulting from the curable antistatic primer composition of the present invention, can be used with a stack of several layers and still provide antistatic properties to an article, even if other functional coatings, especially antireflective coatings of dielectric materials are deposited over said coating.

An object of the invention concerns a process of preparation of the curable antistatic primer composition, which is obtained by the following steps:

mixing at least one polyalkylene oxide polymer with a dendritic polymer previously dried;
adding and stirring to said mixture Lithium salts;
adding a polyisocyanate, and
optionally, adding and mixing a catalyst and a surfactant.

The invention also relates to an optical article having at least one surface comprising an antistatic coating obtained by depositing and curing a curable antistatic primer composition according to the invention.

The invention also relates to a process for forming an antistatic coating onto a substrate of an optical article, said substrate having at least one face, comprising:

preparing a curable antistatic primer composition as defined above;
coating the substrate with said curable antistatic primer composition; and
curing said curable antistatic primer composition.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION OF THE INVENTION AND PREFERRED EMBODIMENTS

Figure 1:
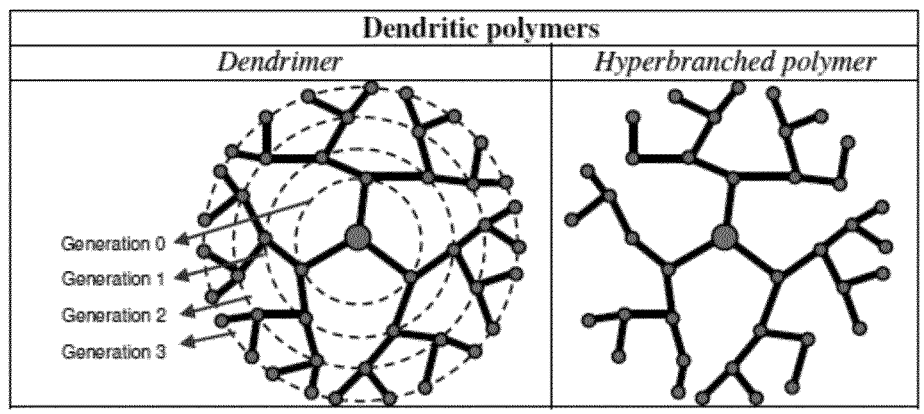
FIG. 1 is a schematic representation of dendrimers and hyperbranched polymers.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about."

Also unless otherwise indicated, the indication of an interval of values «from X to Y» or "between X to Y", according to the present invention, means as including the values of X and Y.

When the optical article comprises one or more surface coatings, the term "to deposit a layer onto the optical article" means that a layer is deposited onto the outermost coating of the optical article, i.e. the coating which is the closest to the air.

The outer layer in a coating stack is the layer that is the closest to the air, before deposition of another coating(s).

The optical article prepared according to the present invention is a transparent optical article, preferably a lens or lens blank, and more preferably an ophthalmic lens or lens blank. The optical article may be coated on its convex main face (front side), concave main face (back side), or both faces with the antistatic coating according to the invention.

Herein, the term "lens" means an organic or inorganic glass lens, preferably an organic lens, comprising a lens substrate which may be coated with one or more coatings of various natures.

The curable antistatic primer composition of the present invention provides, upon curing, a functional coating having antistatic properties. It will be sometimes referred in this patent application as the "antistatic composition".

According to the invention, the curable antistatic primer composition comprises:

(a) at least one polyalkylene oxide polymer;
(b) at least a Lithium salt;
(c) at least an amorphizer selected from at least a dendritic polymer.

The weight ratio of (dry extract of dendritic polymer)/(dry extract of polyalkylene oxide polymer) have an effect on good balance of performances:

amorphiser should be in sufficient amount to inhibit crystallization of the polyalkylene oxide polymer,
amorphiser should not be added in excess or it could impair both mechanical (dendrimer being a soft material as compared to cross-linked matrix) and antistatic performances (dendrimer being an obstacle on polyalkylene oxide polymer network)

Best results are obtained with a weight ratio of (dry extract of said dendritic polymer)/(dry extract of said polyalkylene oxide polymer) ranging from 0.05 to 1.5, in particular ranging from 0.08 to 0.7, and ideally about 0.3.

According to the invention, dendritic polymers include dendrimers which have completely branched star-like topologies and hyperbranched polymers which have imperfectly branched or irregular structures.

Both dendrimer and hyperbranched polymer molecules are composed of repeating units emanating from a central core. The core is characterized by its functionality, which is the number of chemical bonds through which it can be connected to the external parts of the molecule. The functionality of the core is normally three or four. Through the bonds of the core, the layers of linear units (single monomers or linear chains) are attached to the core and each of these arms is terminated with the multifunctional branched unit. Larger molecules are created by adding shells of linear units to the end groups of the layer beneath. If all of these units are attached to the molecule perfectly, a dendrimer is formed. In contrast, the absence of any of these units in the molecule will result in a hyperbranched polymer structure. A schematic representation of dendrimers and hyperbranched polymers is presented in FIG. 1.

Preferably, dendritic polymers of the invention have hydroxyl group at terminal ends thereof.

According to a first characteristic of the invention, the dendritic polymer may have any degree of hydroxyl functionality but it is presently preferred that it be from about 5 to about 60, in particular from about 10 to about 32, typically from 15 to 20 and better of about 16.

As used herein, "hydroxyl functional" and "hydroxyl functionality" refer to the type and number of the indicated functional group available on a multifunctional molecule for reaction with reagents that typically react with such groups. For instance, with regard to dendritic polymers, it refers to the number of functional groups available on the $n^{th}$ generation of the polymer. Thus, for example without limitation, a dendritic polymer that has a hydroxyl functionality of 16 would be understood to have 16 free hydroxyl groups on the outer "surface" of the polymer. Said free groups are available for further polymerization with a cross-linker.

According to a second characteristic of the invention, the dendritic polymer has a number average molar mass Mn ranging from 500 to 5000 g/mol, preferably ranging from 1000 to 3000 g/mol, in particular from 1500 to 2000 g/mol and ideally of about 1750.

In particular, dendritic polymer is a dendritic poylester or polyether.

It has been found that this kind of compounds, thanks to their unique molecular structure, in particular their exceptional concentration of hydroxyl reactive groups and/or their specific number average molar mass Mn and/or branching density, provide excellent thermal and chemical resistance.

Advantageously, the dendritic polymer has branching units which are selected from 2,2-bis(methylol)propionic acid, 2,2-bis(methylol)butanoic acid or mixtures thereof.

For instance, dendritic polymers of the invention may be commercially available from Perstorp under the trade name Boltorn H20®, Boltorn H30®, Boltorn H40® or mixture thereof.

Figure 2:
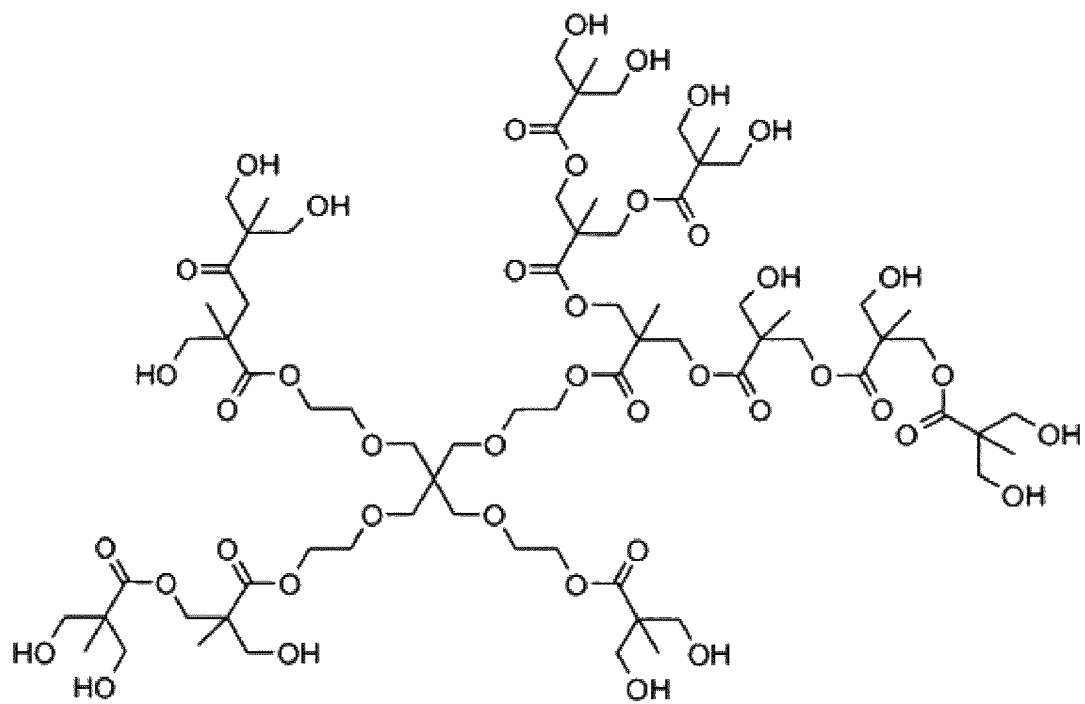
FIG. 2 is a structural representation of a hyperbranched polyester having 2,2-bis(methylol)propionic acid (bis-MPA).

Especially, dendritic polymer according to the invention is a hyperbranched polyester having 2,2-bis(methylol)propionic acid (bis-MPA) branching units available under the trade name Boltorn H20® and having the structure represented in FIG. 2.

The content of the dendritic polymer, by weight (dry extract), relative the total weight of the curable antistatic primer composition (dry extract) is ranging from 5% to 20%, preferably 10% to 20% and ideally of about 15%+/−2%.

Hence, a relative large amount of dendritic polymer may be used. Indeed, the dendritic polymer used according to the invention may surprisingly substitute in part the polyalkylene oxide polymer in order to reduce the crystallization risks of said polyalkylene oxide polymer, such as PEO, while enhancing the adhesion to the susbstate.

According to the invention, the polyalkylene oxide polymer may be polyethylene oxide, polypropylene oxide, polybutylene oxide or a mixture thereof.

Preferably, the polyalkylene oxide polymer is polyethylene oxide (PEO), preferably linear PEO.

In particular, the polyalkylene oxide polymer conductive polymer according to the invention has a relatively low molecular mass. For example, it has a number average molar mass Mn ranging from 200 to 1000 g/mol, preferably ranging from 350 to 500 g/mol and ideally of around 400 g/mol.

Typically, PEO having a number average molecular weight Mn ranging from 350 to 500 g/mol and ideally of around 400 g/mol. For instance, PEO polyol with a hydroxyl functionality of from 2-6 hydroxyl groups may be used.

The content of the polyalkylene oxide polymer, by weight (dry extract), relative the total weight of the curable antistatic primer composition (dry extract) is ranging from 40% to 60%, preferably 40% to 50% and ideally 43%-45%.

The polyalkylene oxide polymer according to the invention is able to react with a cross-linking agent so as to form a matrix for Lithium salts.

Examples of Lithium salts according to the invention may be selected from: lithium perchlorate (LiClO4), lithium hexafluorophosphate (LiPF6), lithium hexafluoroarsenate (LiAsFe), lithium iodine (LiI, lithium bromide (LiBr). lithium thiocyanate (LiSCN), lithium nitrate ($LiNO_3$), lithium sulfide ($Li_2S$), lithium tris(trifluoromethylsufonyl) methide ($LiC(SO_2CF_3)_3$), trifluoromethanesulfonic acid lithium salt ($LiSO_3CF_3$), lithium(bis)trifluoromethane sulfonimide ($LiN(SO_2CF_3)_2$), lithium(bis)perfluoroethane sulfonamide ($LiN(SO_2C_2F_5)_2$), 5-lithiosulfo isophthalic acid, 3,5-diiodo-2-hydroxybenzoic acid lithium salt, 3,5-diiodosalicyclic acid lithium salt, beta-hydroxypyruvic acid lithium salt hydrate, carbamoylphosphate dilithium salt, p-toluenesulfinic acid lithium salt, poly(etlhylene-co-methacrylic acid) lithium salt, toluene-4-sulfinic acid lithium salt anhydrous, and so forth, all of which may be used solely or in combination with others. It is preferable to use lithium(bis) trifluoromethane sulfonamide ($LiN(SO_2CF_3)_2$) or lithium (bis)perfluoroethane sulfonamide ($LiN(SO_2C_2F_5)_3$) or trifluoromethanesulfonic acid lithium salt ($LiSO_3CF_3$).

The content of Lithium salts, by weight (dry extract), relative the total weight of the curable antistatic primer composition (dry extract) is ranging from 5% to 15%, preferably 10%.

According to the invention, polyalkylene oxide polymer and dendritic polymer are capable of reacting with a cross-linking agent, such as polyisocyanate.

A presently preferred cross-linking agent is polyisocyanate having for instance an isocyanate functionality of from 2 to 6, such as diisocyanate, which can react with hydroxyl groups of the polyalkylene oxide polymer and/or of the dendritic polymer to form urethanes.

Indeed, according to an embodiment of the curable antistatic primer composition of the invention, the dendritic polymer and the PEO react with the diisocyanate compound to form a poly-urethane polymeric matrix adapted to be a solid electrolyte support for Lithium salts.

Preferably, the diisocyanate compound may be selected from the group consisting of 1,6-hexamethylene diisocyanate (HMDI); 4,4-dicyclohexylmethane diisocyanate; 3-isocyanato methyl-3,5,5-trimethyl cyclohexyl isocyanate; 1,4-cyclohexyl diisocyanate; 2,2,4-trimethylhexamethylene diisocyanate; 1,4-phenylene diisocyanate; 2,4-toluene diisocyanate; 2,6-toluene diisocyanate; 2,2'-methylene diphenyl diisocyanate; 2,4'-methylene diphenyl diisocyanate; 4,4'-methylene diphenyl diisocyanate; naphthalene diisocyanate; and mixtures thereof.

The content of the polyisocyanate, by weight (dry extract), relative the total weight of the curable antistatic primer composition (dry extract) is ranging from 25% to 40%, preferably 30%+/−2%.

The Applicant has surprisingly found that such a curable antistatic primer composition minimizes or cancels the triboelectric effect while keeping the abrasion-resistance, transmittance, low haze properties of a lens comprising a standard primer layer instead of the PEO-based primer layer. These differents properties are shown in examples 1 to 3 below. In addition, it has also be found, that the antistatic and optical properties of the reference PEO-based antistatic film are at least reached, while the mechanical performances are enhanced with the antistatic coating formed from the curable antistatic primer composition of the invention.

To form the curable antistatic primer composition of this invention, the dendritic polymer and the polyalkylene oxide polymer can be dissolved in a suitable solvent such as, without limitation, acetone, methyl ethyl ketone, DiMethyl SulfOxide (DMSO), DiMethyl Formamide (DMF), 1-4 carbon alcohol, glycols, diglyme, toluene, xylene, ethylene or propylene glycol, methoxy propanol, methoxy ethanol.

A catalyst is also generally used so as to speed the cure time. The additive according to the invention may be for instance dibutyl tin laurate (DBTDL).

In addition, other additives may be typically added including wetting agents such as BYK 340 sold by BYK Chemie or EFKA® 3034 sold by Ciba Specialty Chemicals.

For example, the curable antistatic primer composition comprises, by weight, relative to the total weight of the curable coating composition:
(a) from 40% to 60%, preferably 40% to 50% and ideally 43-45%, by weight, of the polyalkylene oxide polymer;
(b) from 5% to 15%, preferably 10%, by weight, of Lithium salts;
(c) from 25% to 40%, preferably 30%+/−2%, by weight, of polyisocyanate;
(d) from 5% to 20%, preferably 10% to 20% and ideally 15%+/−2%, by weight, of the dendritic polymer;
(e) and optionally from 10% to 25%, by dry content weight, of a solvent.

According to a preferred embodiment, the curable antistatic primer composition comprises, by weight, relative to the total weight of the curable antistatic primer composition:
(a) from 40% to 60%, preferably 40% to 50% and ideally 43-45%, by weight, of polyethylene oxide;
(b) from 5% to 15%, preferably 10%, by weight, of Lithium salts;
(c) from 25% to 40%, preferably 30%+/−2%, by weight, of 1,6-hexamethylene diisocyanate;
(d) from 5% to 20%, preferably 10% to 20% and ideally 15%+/−2%, by weight, of at least the dentitric polymer having hydroxyl group at terminal ends thereof and a degree of hydroxyl functionality from 15 to 20;
(e) and optionally from 10% to 25%, by dry content weight, of a solvent.

Articles obtained according to the invention will now be described in more details.

The present invention provides optical articles having charge decay times ≤500 milliseconds, preferably ≤200 milliseconds and better ≤150 milliseconds.

The final optical articles preferably do not absorb light in the visible range (or little), which means herein that the antistatic (AS) coating has a luminous absorption in the visible range of 1% or less, and/or a relative light transmission factor in the visible spectrum, Tv, preferably higher than 90%, more preferably higher than 95%, and even more preferably higher than 96%. Preferably, both features are simultaneously satisfied and can be reached by carefully controlling thicknesses of the coating.

As used herein, the Tv factor is such as defined in the standard NF EN 1836 and corresponds to the 380-780 nm wavelength range.

In an alternative embodiment, the optical article may be tinted or dyed and absorb light in the visible range.

The final optical articles prepared according to the invention preferably have low haze characteristics. Haze is a measurement of the transmitted light scattered more than 2.5° from the axis of the incident light. The smaller the haze value, the lower the degree of cloudiness. The haze value of the present optical articles is preferably less than 0.8%, and more preferably less than 0.5%.

The substrate may be made of mineral glass or organic glass, preferably organic glass (polymer substrate). The organic glasses can be made of any material currently used for organic ophthalmic lenses:
thermoplastic materials and thermoplastic polyurethanes
thermosetting (cross-linked) materials such as those obtained by polymerization of allyl derivatives such as the allyl carbonates of linear or branched aliphatic or aromatic polyols, such as ethylene glycol bis(allyl carbonate), diethylene glycol bis(2-methyl carbonate), diethylene glycol bis(allyl carbonate), ethylene glycol bis(2-chloroallyl carbonate), triethylene glycol bis(allyl carbonate), 1,3-propanediol bis(allyl carbonate), propylene glycol bis(2-ethylallyl carbonate), 1,3-butenediol bis(allyl carbonate), 1,4-butenediol bis(2-bromoallyl carbonate), dipropylene glycol bis(allyl carbonate), trimethylene glycol bis(2-ethylallyl carbonate), pentamethylene glycol bis(allyl carbonate), isopropylene bisphenol-A bis(allyl carbonate),
thermosetting materials such as poly(meth)acrylates and copolymers by the polymerization of alkyl methacrylates, in particular $C_1$-$C_4$ alkyl methacrylates such as methyl (meth)acrylate and ethyl (meth)acrylate, substrates comprising (meth)acrylic polymers and copolymers derived from bisphenol-A, polyethoxylated aromatic (meth)acrylates such as the polyethoxylated bisphenolate di(meth)acrylates, polythio(meth)acrylates,
thermosetting polyurethanes, polythiourethanes, polyepoxides, polyepisulfides,
as well as copolymers thereof and blends thereof.

In general, polycarbonate substrates are not recommended when the curable antistatic primer composition is prepared with acetone as solvent.

The substrates may obviously be obtained by polymerizing mixtures of the above monomers. By (co)polymer, it is meant a copolymer or polymer. By (meth)acrylate, it is meant an acrylate or methacrylate.

Substrates particularly recommended substrates obtained by polymerization or copolymerization of diethylene glycol bis(allyl carbonate), sold under the trade name CR-39® by PPG INDUSTRIES (ORMA® ESSILOR lens), polythiourethanes substrates known as MR7 and MR8 (Mitsui Chemicals), Ultra High Index substrates known as MR1.74 (Mitsui Chemicals) and acrylic substrates having refractive index about 1.6.

The surface of the article onto which the antistatic primer coating of the invention is directly deposited, may optionally be subjected to a physical or chemical pre-treatment step intended to improve adhesion, for example a high-frequency discharge plasma treatment, a glow discharge plasma treatment, a corona treatment, an electron beam treatment, an ion beam treatment, a solvent treatment or an acid or base (NaOH) treatment.

According to a characteristic of the invention, the antistatic coating composition is deposited onto a substrate in a manner such that, after curing, it forms an antistatic primer coating having a thickness of 1 micrometer or more, preferably from 1 to 100 micrometers, more preferably from 2 to 10 micrometers and better from 2.5 to 6 micrometers.

Any abrasion resistant coating known in the art may be used in this embodiment of the invention and deposited onto the antistatic coating of the present invention.

By definition, an abrasion resistant coating is a coating which improves the abrasion resistance of the finished optical article as compared to a same optical article but without the scratch-resistant coating.

Examples of abrasion resistant coating compositions are disclosed in EP 614957, U.S. Pat. No. 4,211,823, WO 94/10230, U.S. Pat. No. 5,015,523.

The most preferred scratch-resistant coating compositions are those comprising as the main constituents an epoxyalkoxysilane such as, for example, [gamma]-glycidoxypropyltrimethoxysilane (GLYMO) and a dialkyldialkoxysilane such as, for example dimethyldiethoxysilane (DMDES), colloidal silica and a catalytic amount of a curing catalyst such as aluminum acetylacetonate or a hydrolyzate thereof, the remaining of the composition being essentially comprised of solvents typically used for formulating these compositions in the art In addition, a mono or multilayer antireflective coating comprising an outer layer may optionally be directly deposited over said anti-abrasion coating.

Anti-reflection (AR) coatings and their methods of making are well known in the art and are disclosed in US20080206470. The AR coating of the present invention may include any layer or stack of layers which improves the anti-reflective properties of the finished optical article over at least one portion of the visible spectrum, thereby increasing the transmission of light and reducing surface reflectance at the article-air interface.

Preferably, the total physical thickness of the AR coating is lower than 1 micrometer, more preferably lower than or equal to 500 nm. The total physical thickness of the anti-reflection coating is generally higher than 100 nm, preferably higher than 150 nm.

According to a specific embodiment, an anti-fouling top coat may be deposited over said outer layer of said antistatic coating.

The anti-fouling top coat is defined as a hydrophobic and/or oleophobic surface coating. The ones preferably used in this invention are those which reduce surface energy of the article to less than 20 mJ/m$^2$. The invention has a particular interest when using anti-fouling top coats having a surface energy of less than 14 mJ/m$^2$ and even better less than 12 mJ/m$^2$.

The surface energy values referred above are calculated according to Owens Wendt method, described in the following document: Owens, D. K.; Wendt, R. G. "Estimation of the surface force energy of polymers", J. Appl. Polym. Sci. 1969, 51, 1741-1747.

Generally, the deposited anti-fouling top coat has a physical thickness lower than 30 nm, preferably ranging from 1 to 20 nm, more preferably ranging from 1 to 10 nm, and even better from 1 to 5 nm. Control of the deposited thickness can be performed by means of a quartz scale.

The article thus obtained exhibit ultra hydrophobic properties along with antistatic properties and abrasion resistance.

Whatever the embodiment of the present invention, the curable antistatic primer coating of the invention shows many advantages compared to other antistatic coating systems, including 1) It may be processed simply and at low temperature (~100° C.) process;

2) It is applicable to most of substrates with excellent adhesion;

3) It has excellent abrasion resistance 4) it allows flexible process to make other functional coatings;

The curable antistatic primer coating has specific applications in the optical lens industry, especially for ophthalmic lens such as eyeglass lenses.

The present invention also relates to a process of preparation of the curable antistatic primer composition, which is obtained by the following step:

mixing at least one polyalkylene oxide polymer with a dendritic polymer previously dried;

adding and stirring to said mixture Lithium salts;

adding a polyisocyanate, and optionally, adding and mixing a catalyst and a surfactant (also, previously dried).

The invention also relates to a process for forming an antistatic coating onto a substrate of an optical article, said substrate having at least one face, comprising:

preparing a curable antistatic primer composition as defined above;

coating the substrate with said curable antistatic primer composition; and curing said curable antistatic primer composition.

The antistatic coating is generally applied by any wet-coating method, such as dip coating, spray coating or spin coating.

Indeed, the present invention also relates to an optical article having at least one surface comprising an antistatic coating obtained by depositing on a substrate and curing the curable antistatic primer composition as defined above.

Now, the present invention will be described in more detail with reference to the following examples. These examples are provided only for illustrating the present invention and should not be construed as limiting the scope and spirit of the present invention

EXAMPLES

1. Testing Methods

The following test procedures were used to evaluate the optical articles prepared according to the present invention. Three samples for each system were prepared for measurements and the reported data were calculated in the average of three data.

a) Charge Decay Time

In the present patent application, charge decay times of optical articles which have been beforehand subjected to a corona discharge at 900 volts were measured using JCI 155v5 Charge Decay Test Unit from John Chubb Instrumentation at 25° C. and 50% relative humidity.

The unit was set up with JCI 176 Charge Measuring Sample Support, JCI 191 Controlled Humidity Test Chamber, JCI 192 Dry Air Supply Unit and Calibration of voltage sensitivity and decay time measurement performance of JCI 155 v5 (from John Chubb Instrumentation) to the methods specified in British Standard and Calibration voltage measurements and resistor and capacitor values traceable to National Standards.

b) Dry Adhesion Test

Dry adhesion of the transferred coatings was measured using the cross-hatch adhesion test according to ASTM D3359-93, by cutting through the coatings a series of 5 lines, spaced 1 mm apart with a razor, followed by a second series of 5 lines, spaced 1 mm apart, at right angles to the first series, forming a crosshatch pattern comprising 25 squares. After blowing off the crosshatch pattern with an air stream to remove any dust formed during scribing, clear cellophane tape (3M SCOTCH® n° 600) was then applied over the crosshatch pattern, pressed down firmly, and then rapidly pulled away from coating in a direction perpendicular to the coating surface. Application and removal of fresh tape was then repeated two additional times. Adhesion is rated as follows (0 is the best adhesion, 1-4 is in the middle, and 5 is the poorest adhesion).

c) Haze Value and Transmittance (Tv)

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's instructions. Next, the sample was placed on the transmission light beam of the pre-calibrated meter and the haze value was recorded from three different specimen locations and averaged.

Tv was measured using the same device.

"Luminous transmittance" or "relative light transmission factor in the visible spectrum" Tv (or ζv) is also defined in the standard ISO 13666:1998 and is measured according to the standard ISO 8980-3 (from 380 to 780 nm).

d) Bayer Abrasion Test (with Alumine) (will be Referred as ISTM Bayer)

Bayer abrasion resistance is determined by measuring the percent haze of a coated and uncoated lens, before and after testing on an oscillating sand abrader as in ASTM F 735-81 The abrader is oscillated for 300 cycles with approximately 500 g of aluminum oxide ($Al_2O_3$) ZF 152412 supplied by Specially Ceramic Grains (former Norton Materials) New Bond Street, PO Box 15137 Worcester, Mass. 01615-00137. The haze is measured using a Pacific Scientific Hazemeter model XL-211. The ratio of the uncoated lens haze (final-initial) is a measure of the performance of the coating, with a higher ratio meaning a higher abrasion resistance.

e) Scratch-Resistance: Hand Steel Wool Test (HSW)

The HSW test was implemented on the convex side of the lens only. Waiting time of 24 hours is respected to perform the test if an antireflection coating is deposited on the lens.

The lens was manually abraded with a steel wool perpendicularly to fibers direction performing 5 back and forth (with an amplitude from 4 to 5 cm) keeping an index finger constant pressure on the steel wool.

Strength pressed on the steel wool can be evaluated with a balance: fix the lens on the balance plate with adhesive tape and press down the lens with the index finger exercising normally strength on the lens. This strength is about 5 Kg during the first way and about 2.5 Kg during the return way.

Lenses were visually inspected and noted according to the following table.

TABLE 1

| Product Behavior | Low resistance | Acceptable area | Good resistance |
|---|---|---|---|
| Note | 5 | 3 | 1 |

The higher is the note, the more abraded is the lens, the worse the coating performance.

2. Experimental Details 2.1 Example 1 a) Substrate

The substrate is an ORMA® lens, in organic glass, constituted of polymers of ethylene glycol bis (allylcarbonate) (CR-39®) with a central thickness of 2 mm.

b) Antistatic Compositions for Examples #A to C

Three compositions were prepared: one composition was the one of the invention (composition #A) and two other compositions were prepared to be compared with the composition of the invention (compositions #B and #C).

Those two last compositions #B and #C are identical to composition #A except that one composition (composition #B) does not contain any "amorphiser" and is mainly composed of PEO and HMDI and the second uses polycaprolactone (PCL) as "amorphiser".

Composition #A according to the Invention An antistatic composition #A according to the invention is described in table 2 (ingredient in w %) below:

TABLE 2

| Ingredients | CAS No. | Mn |
|---|---|---|
| Polyethylene oxide (PEO) | 25322-68-3 | 400 |
| Lithium salts ($CF_3SO_3Li$) | 33454-82-9 | — |
| Dendritic polymer (Boltorn H20 ®) | 326794-48-3 | 2100 |
| Hexamethylene diisocyante (HMDI) | 822-06-0 | |
| Dibutyl tin dilaurate (DBTDL) | 77-58-7 | — |
| Acetone | 67-64-1 | — |
| Surfactants BYK 340 ®* | | — |

*BYK 340 ® was acquired in a solution comprising 10% solid content fluorocarbon surfactant dissolved in dipropylene monomethyl ether. The solvent is removed by heating under vacuum. Hence, the amount of BYK 340 ® used in the examples is to be understood as a 100% fluorocarbon solid content.

The general method for preparing the antistatic composition is as follow:

firstly, the dendritic polymer (Boltorn H20®) and PEO polymers are dissolved in acetone under magnetic stirring; the dendritic polymer (Boltorn H20®) has been previously dried at 60° C. under vacuum for overnight in order to be in pure solid form;

then lithium salts are added into the solution and stirred continuously to form the complex PEO-Li.;

the solution is heated to 50° C. to hasten the solubilization process;

HMDI is added into the solution and stirred for about 15-20 min;

dibutyl tin dilaurate (DBTDL) and surfactant BYK 340® are added and the solution is stirred for about 5-10 min.;

the solution is then filtered and the filtrate is degassed by ultrasonication and then used to prepare anti-static coat by dip or spin coating method;

finally, thee coating sample is cured over 6 hours at 60° C.

The thickness targeted is 1~1.5 μm. The actual thickness can be controlled by the usual means for controlling thickness in wet-coatings (i.e.: namely dip speed, rotational speed, quantity of matter deposited depending on the method used).

Composition #B According the Prior Art

A first antistatic composition #B according the prior art is also prepared by following the above described method of preparation for composition #A. This antistatic composition #B does not comprise dendritic polymer or polycaprolactone (PCL).

Composition #C According the Prior Art

A second antistatic composition #C according the prior art and comprising the same ingredients as the antistatic composition#A except that dendritic polymer is replaced by PCL (Mn=400, CAS No.: 24980-41-4), is prepared by following the above described method of preparation for composition #A.

Then, composition #A, #B or #C was each applied by dip coating on an ORMA® lens described above.

c) Anti-Abrasion Composition

The anti-abrasion composition used for the examples is the one described in example 3 of the patent EP 614957.

The process of preparation is as follow:
79.5 parts of 0.1 N hydrochloric acid were added dropwise to a solution containing 224 parts of GLYMO and 117 parts of DMDES;
the hydrolysed solution was stirred for 24 hours at room temperature and then 724 parts of 30% colloidal silica in methanol, 15 parts of aluminium acetylacetonate and 44 parts of ethylcellosolve were added;
a small amount of surfactant was added.

The TDC (theoretical dry content) of the composition was in the order of 34% of solid material from the hydrolyzed DMDES.

To achieve the anti-static property and abrasion resistance, the hard coating thickness, of value between 2 µm and 5 µm included, especially between 3 µm and 3.5 µm included, is deposited by spin coating on the ORMA® lens previously coated with the cured antistatic composition #A, #B or #C. The thickness may be controlled by the dipping rate. The hard coat layer is then cured at 75° C. during 20 min and followed by a post-curing at 105° C. for 3 hours. It forms a layer of about 3-5 µm of thickness.

d) Comparing Antistatic Coat Compositions

The formulations of compositions #A, #B or #C are listed in table 3 below. In those three compositions, the amounts of lithium salt and HMDI were the same.

TABLE 3

| Antistatic coat compositions | Coating solution ingredients (weight %) | | | | | | | Solid compound relative weight | Acetone (ml) |
|---|---|---|---|---|---|---|---|---|---|
| | Boltorn H20 ® | PCL | PEO | $CF_3SO_3Li$ | HMDI | DBTDL | BYK 340 | | |
| #A % | 14.7% | — | 44.2% | 10.3% | 29.4% | 1.0% | 0.4% | 100.0% | 441.7% |
| #B % | 0.0% | — | 62.2% | 10.3% | 26.1% | 1.0% | 0.4% | 100.0% | 441.7% |
| #C % | 0.0% | 14.0% | 44.2% | 10.3% | 30.2% | 1.0% | 0.4% | 100.0% | 441.7% |

The results of performance tests on ORMA® lens half-finished lens are shown on Table 4 below.

TABLE 4

| Property Measurment means | Charge decay time (ms) JCI, humidity 50% at 25° C. | Haze (%) Haze-Gard | Abrasion resistance Steel Wool |
|---|---|---|---|
| #A (invention) | 18.5 | <0.1 | 3 |
| #B PEO-ref | 218 | 1.21 | 5 |
| #C PCL | 23.9 | 0.48 | 5 |

Table 4 shows clearly that both composition #C with PCL and the composition #A with the dendritic polymer of the invention improve the conductivity of the antistatic layer (reduces time for charge decay), by being an order of magnitude below the performances of a standard PEO-based layer (composition #B). It is believed by the Applicant that the basic PEO antistatic coating still comprises too much PEO, which then easily forms crystal. Those PEO crystals can decrease the antistatic property and at the same time increase the haze.

However, it is surprising that the dendritic polymer compound, when present in roughly the same amount as PCL (+/−5%) slightly improves the conductivity of the layer as compared to PCL (about 20-25%).

In addition, PCL does not help improve abrasion resistances performances (5 at the steel-wool test).

It has been found surprisingly that the presence of the dendritic polymer of the invention helps to improve the anti-scratch performances of the anti-scratch layer positioned above. It thus negates the effect of standard PEO-based primers that usually reduce the anti-scratch performances of the hard-coat above when replacing standard primers.

The comparative adhesion performances have not been measured here. However, it is known that standard PEO may have some trouble with adhesion. As will be shown on table 5 below, compositions of the invention have good results in the adhesion tests.

Further, it is to be noted that the presence of the dendritic polymer of the invention as amorphiser improves unexpectedly the haze performances. Indeed, PCL improves the haze performances with regard to PEO. However it stays above the 0.4% limit acceptable for products destined to ophthalmic objects. It is thought to be due to a lesser compatibility of PCL with PEO by contrast with the dendritic polymer of the invention.

Nothing in the dendritic polymer (i.e.: Boltorn H20® dendrimer) structure, be it its radial or pseudo radial shape, the hydroxyl groups or the highly branched structure provided hints that the haze performances could be improved; and it is even more unexpected when it is on top of improving conductivity and anti-scratch performances of the overlayer. It is believed by the Applicant that the structure of the hydroxyl-terminated dendrimer improves the strength of the bonds with both the substrate and the hard coat layer which have different chemistries. The adhesion with the hard coat layer being improved might explain a better behavior of the whole stack in scratch resistance tests.

2.2 Example 2

In this example, three different formulations #1 to #3 of the antistatic composition of the invention using dendritic polymers as amorphiser are presented in order to demonstrate the range of application and performances in term of the mechanical enhancer.

These three formulations #1 to #3 were prepared using the same preparation method as described in example 1 and were each deposited onto an ORMA® lenses and then were coated with the anti-abrasion coating also described in example 1.

These formulations are roughly at 15%, 20% and 35% in weight in Boltorn H2O®, with weight ratio of Boltorn H20®/PEO of respectively 0.3, 0.5 and 1.7. In particular, formulation #3 is identical to composition #A mentionned in example 1.

TABLE 5

| Antistatic coat formulations | Coating solution ingredients (g) | | | | | | | |
|---|---|---|---|---|---|---|---|---|
| | Boltorn H20 ® | PEO | CF$_3$SO$_3$Li | HMDI | DBTDL | BYK 340 | compound relative weight | Acetone (ml) |
| #1 (%) | 35.8% | 21.2% | 4.9% | 37.5% | 0.4% | 0.1% | 100.0% | 354.1% |
| #2 (%) | 19.4% | 38.9% | 9.1% | 31.8% | 0.5% | 0.4% | 100.0% | 453.7% |
| #3 (%) | 14.7% | 44.2% | 10.3% | 29.4% | 1.0% | 0.4% | 100.0% | 441.7% |

The performances of these above formulations #1 to 3 according to the invention are illustrated in the table 6 below:

TABLE 6

| Property | Charge decay time (ms) | Transmittance | Haze (%) | Adhesion of | Abrasion resistance | |
|---|---|---|---|---|---|---|
| Measurement means | JCI, humidity 50% at 25° C. | Cary-50 UV-Visible | Haze-Gard | anti-static coat Dry cross hatch | ISTM-Bayer | Steel Wool |
| #1 | >1000 | 92.7 | <0.1 | 0 | — | 3 |
| #2 | 239.0 | 92.7 | 0.15 | 0 | — | 3 |
| #3 | 123.6 | 92.7 | 0.12 | 0 | 4.194 | 3 |

The results of the different performance tests carried out on ORMA® lenses show that the antistatic property is improved by formulation 3 (charge decay time at 123.6 ms) and the other properties are still preserved, in particular good optical and mechanical properties.

2.3 Example 3

In the following example, composition #3 was also tested onto other lenses substrates such as MR7, MR8, MR1.74 and Acrylic 1.6.

The results of the tests shown in Table 7 are good on those lenses, for antistatic, antiscratch or even haze performances.

TABLE 7

| Lens samples | Charge decay time (ms) JCI, humidity 50% at 25° C. | Transmittance Cary-50 UV-Visible | Haze (%) Haze-Gard | Adhesion of anti-static hard coat Dry cross hatch | Abrasion resistance ISTM-Bayer | Steel Wool |
|---|---|---|---|---|---|---|
| #3-MR7 | 189 | 91.1 | 0.07 | 0 | 5.00 4.06 | 3 |
| #3-MR8 | 175 | 91.9 | 0.18 | 0 | 3.46 2.98 | 3 |
| #3-MR1.74 | 121 | 90.7 | 0.00 | 0 | — | 3 |
| #3-Acrylic 1.6 | 185 | 91.6 | 0.04 | 0 | — | 3 |

Good antistatic and mechanical properties are also obtained when the formulation of the invention is applied onto other substrates.

As a conclusion, optical lens obtained from the compositions according to the invention meet the preferred requirements regarding antistatic properties (decay time <200 ms at 50% of humidity). Further, the sample composition displayed excellent adhesion of the layer on the substrate and good scratch resistance as well as high transmittance (92.5%-93%) and low haze level (0.1%). Good adhesion on MR7, MR8 1,74 and acrylic 1.6 susbstrates is also obtained.

The properties of manual steel wool of PEO-based and PCL-based composition are weaker than Boltorn H20®-based coating composition. It also shows that, comparing to PEO and PCL, the mechanical properties are improved in the polyurethane (PU) system when Boltorn H20®-is used in the antistatic composition.

The invention claimed is:

1. A curable antistatic primer composition comprising:
   at least one polyalkylene oxide polymer;
   at least a lithium salt; and
   at least an amorphizer comprising at least a dendritic polymer wherein the composition is further defined as having a weight ratio of (dry extract of said dendritic polymer)/(dry extract of said polyalkylene oxide polymer) ranging from 0.05 to 1.5.

2. The curable composition of claim 1, wherein the dendritic polymer is a hyperbranched polymer or a dendrimer having hydroxyl group at terminal ends thereof.

3. The curable composition of claim 2, wherein the dendritic polymer has a degree of hydroxyl functionality from 5 to 60.

4. The curable composition of claim 1, wherein the dendritic polymer has a number average molecular weight Mn ranging from 500 to 5000 g/mol.

5. The curable composition of claim 4, wherein the dendritic polymer has a number average molecular weight Mn ranging from 1000 to 3000 g/mol.

6. The curable composition of claim 1, wherein the dendritic polymer is a dendritic polyether or dendritic polyester.

7. The curable composition of claim 6, wherein the dendritic polymer is a dendritic polyether or dendritic polyester, comprising branching units further defined as 2,2-bis(methylol)propionic acid, 2,2-bis(methylol)butanoic acid, and/or a mixture thereof.

8. The curable composition of claim 1, wherein the polyalkylene oxide polymer has a number average molecular weight Mn ranging from 200 to 1000 g/mol.

9. The curable composition of claim 1, wherein the polyalkylene oxide polymer is polyethylene oxide, polypropylene oxide, polybutylene oxide, or a mixture thereof.

10. The curable composition of claim 1, further comprising a polyisocyanate which is able to form a polyurethane compound with at least the polyalkylene oxide polymer.

11. The curable composition of claim 10, wherein the polyisocyanate is 1,6-hexamethylene diisocyanate.

12. The curable composition of claim 10, comprising, by weight, relative to the total weight of the curable coating composition:
from 40% to 60% by weight of the polyalkylene oxide polymer;
from 5% to 15% by weight of lithium salts;
from 25% to 40% by weight of polyisocyanate; and
from 5% to 20% by weight of dendritric polymer.

13. The curable composition of claim 12, comprising, relative to the total weight of the curable coating composition:
from 40% to 50% by weight of the polyalkylene oxide polymer.

14. The curable composition of claim 12, further comprising:
from 10% to 25% by dry content weight of a solvent.

15. A process of preparation of a curable antistatic primer composition as defined in claim 10, comprising:
mixing at least one polyalkylene oxide polymer with a dendritic polymer previously dried;
adding and stirring to said mixture lithium salts; and
adding a polyisocyanate.

16. The process of claim 15, further comprising adding and mixing a catalyst and a surfactant.

17. An optical article having at least one surface on which an antistatic primer coating is obtained by depositing on a substrate and curing a curable antistatic primer composition of claim 1.

18. The optical article of claim 17, further defined as an ophthalmic lens.

19. A process for forming an antistatic coating onto a substrate of an optical article, said substrate having at least one face, comprising:
preparing a curable antistatic primer composition of claim 1;
coating the substrate with said curable antistatic primer composition; and
curing said curable antistatic primer composition.

20. A curable antistatic primer composition comprising:
at least one polyalkylene oxide polymer;
at least a lithium salt; and
at least an amorphizer comprising at least a dendritic polymer:
wherein the dendritic polymer is a hyperbranched polymer or a dendrimer having hydroxyl group at terminal ends thereof, and wherein the dendritic polymer has a degree of hydroxyl functionality from 5 to 60.

21. The curable composition of claim 20, further comprising a polyisocyanate which is able to form a polyurethane compound with at least the polyalkylene oxide polymer.

22. The curable composition of claim 21, comprising, by weight, relative to the total weight of the curable coating composition:
from 40% to 60% by weight of the polyalkylene oxide polymer;
from 5% to 15% by weight of lithium salts;
from 25% to 40% by weight of polyisocyanate; and
from 5% to 20% by weight of dendritric polymer.

23. The curable composition of claim 22, further comprising:
from 10% to 25% by dry content weight of a solvent.

* * * * *